April 10, 1956 V. S. GOLEMON 2,741,426

ACCUMULATOR SELECTION MECHANISM

Filed June 16, 1952 9 Sheets-Sheet 1

INVENTOR,
Valia S. Golemon
BY
Fred N. Schwend
ATTORNEY

INVENTOR,
Valia S. Golemon

BY

Fred N. Schwend

ATTORNEY.

April 10, 1956 V. S. GOLEMON 2,741,426

ACCUMULATOR SELECTION MECHANISM

Filed June 16, 1952 9 Sheets-Sheet 3

INVENTOR,
Valia S. Golemon

BY Fred N. Schwend

ATTORNEY.

INVENTOR,
Valia S. Golemon
BY
Fred N. Schwend
ATTORNEY.

April 10, 1956

V. S. GOLEMON 2,741,426

ACCUMULATOR SELECTION MECHANISM

Filed June 16, 1952

9 Sheets-Sheet 5

INVENTOR,
Valia S. Golemon

BY Fred N. Schwend

ATTORNEY.

April 10, 1956 V. S. GOLEMON 2,741,426

ACCUMULATOR SELECTION MECHANISM

Filed June 16, 1952 9 Sheets-Sheet 6

INVENTOR,
*Valia S. Golemon*

BY *Fred N. Schwend*

ATTORNEY.

ACCUMULATOR SELECTION MECHANISM

Filed June 16, 1952

INVENTOR,
Valia S. Golemon
BY
Fred M. Schwend
ATTORNEY.

INVENTOR.
Valia S. Golemon
BY
Fred N. Schwend
ATTORNEY.

INVENTOR.
Valia S. Golemon
BY
Fred N. Schwend
ATTORNEY.

United States Patent Office 2,741,426

Patented Apr. 10, 1956

2,741,426

ACCUMULATOR SELECTION MECHANISM

Valia S. Golemon, Burbank, Calif., assignor to Clary Corporation, a corporation of California Application June 16, 1951, Serial No. 231,948

6 Claims. (Cl. 235—6)

This invention relates to calculating machines including cash registers, adding machines, etc., and has particular reference to machines embodying a plurality of accumulators.

In such multi-accummulator machines, it is often desirable to operate the accumulators in different manners to accommodate different conditions or systems for keeping track of amounts. For example, it is often desirable to use such a machine alternatively, on one hand, to obtain a grand total of items sold and individual totals of items falling in certain groups, and on the other hand, as an adding machine to add and/or subtract items without disturbing the group totals retained in certain of the accumulators.

Again it is often desirable to control the accumulators of a multi-accumulator machine in certain manners during entry of items therein and in other manners during the obtaining of totals and sub-totals therefrom.

A principal object of the present invention is to selectively determine operation of a plurality of accumulators under the joint control of two manually settable elements. Another object is to provide accumulator selection control keys for normally selecting corresponding accumulators for operation and to supersede such selection under certain machine control conditions by a separate manually settable control member.

Another object is to provide accumulator selection control keys for normally selecting corresponding accumulators and to automatically supersede such selection according to the type of operation, i. e., addition or subtraction.

The manner in which the above and other objects of the invention are accomplished will be readily understood on reference to the following specification when read in conjunction with the accompanying drawings, wherein.

The particular embodiment of the invention disclosed herein is applied to the well-known and commercially available Clary cash registering machine which is disclosed and claimed in its basic form in the copending application of R. E. Boyden et al., S. N. 38,294, filed July 12, 1948, and since matured into Patent No. 2,607,526, issued August 19, 1952. Various operating instrumentalities of the machine particularly of the computing section are disclosed and claimed in the copending application of R. E. Boyden, S. N. 582,553, filed March 13, 1945, and since matured into Patent No. 2,583,810, issued January 29, 1952 and in the patent to E. P. Drake, 2,472,696, issued on June 7, 1949, the latter disclosing and claiming the particular accumulator structure illustrated herein. Therefore, only those parts of the machine which intimately relate to the present invention will be disclosed herein, and reference may be had to said patents for disclosure of details not specifically disclosed herein.

It should be understood, however, that although the invention is disclosed as embodied in a cash register of the multiplex accumulator type, certain of the basic features may be equally well applied to other forms of adding, calculating, or cash registering machines.

*General arrangement*

Figure 2:
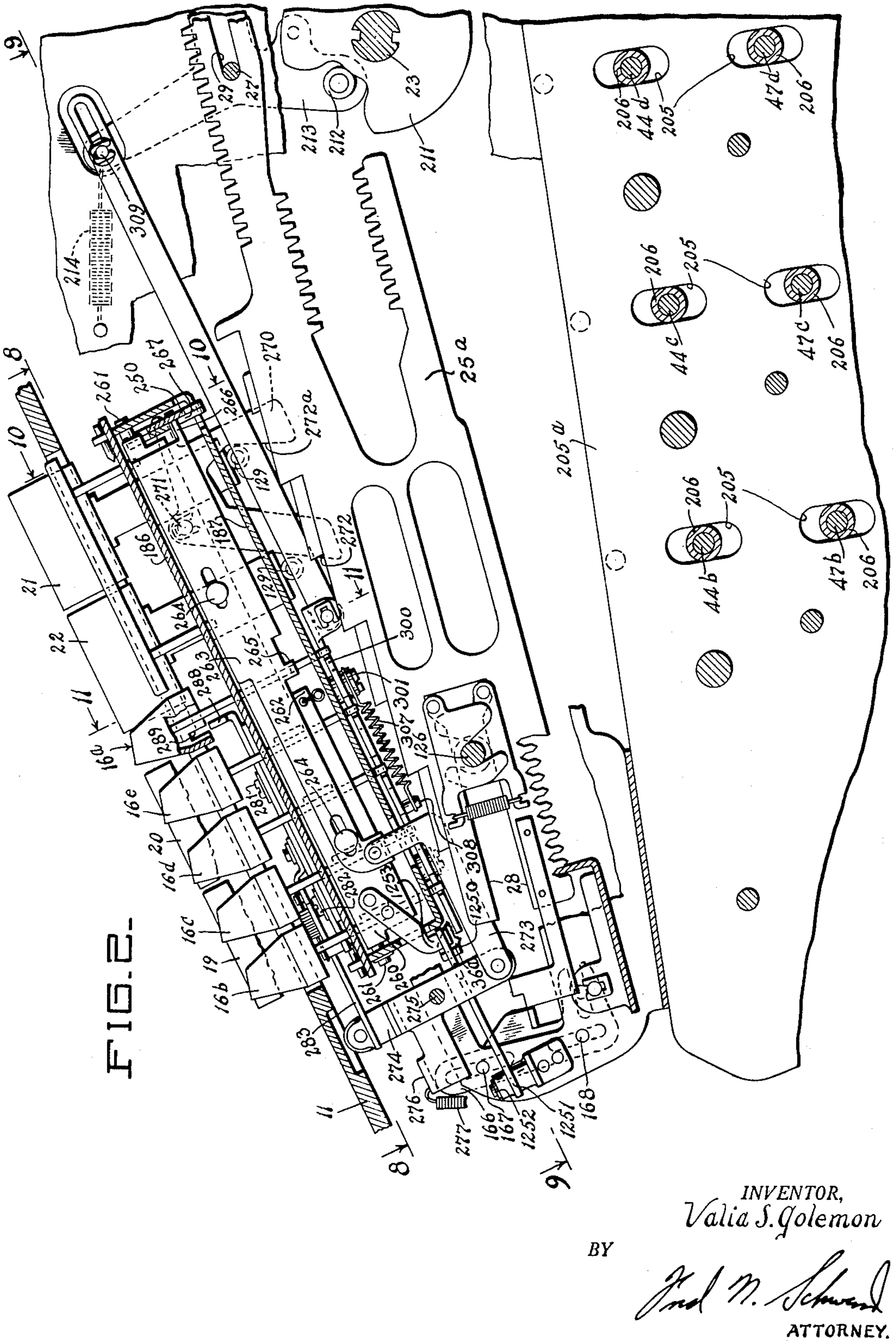
Fig. 2 is a sectional elevational view illustrating part of the keyboard control mechanism.
Figure 3:
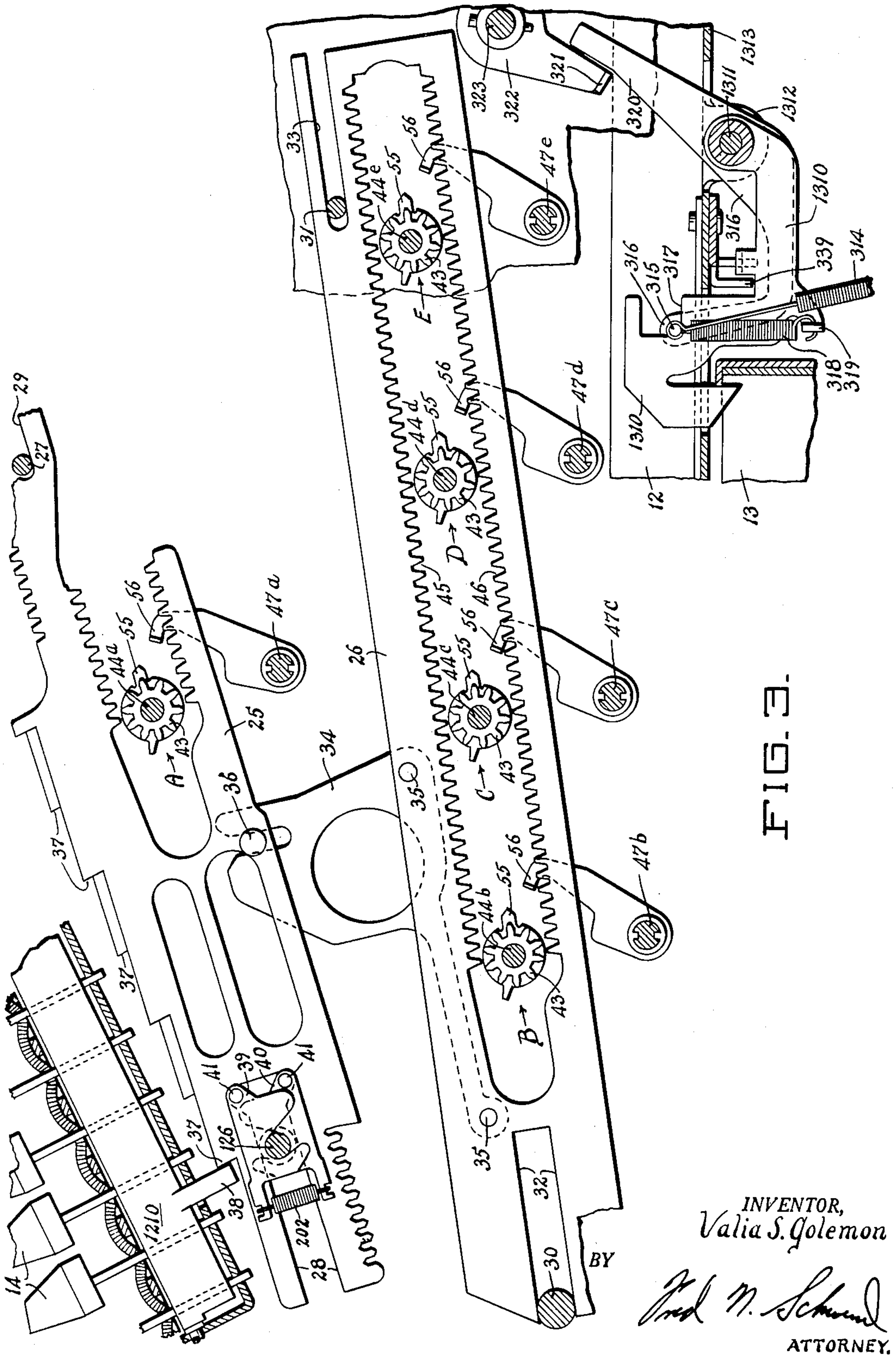
Fig. 3 is a sectional elevational view illustrating the racks and the cash drawer control mechanism.
Figures 13, 14, 15:
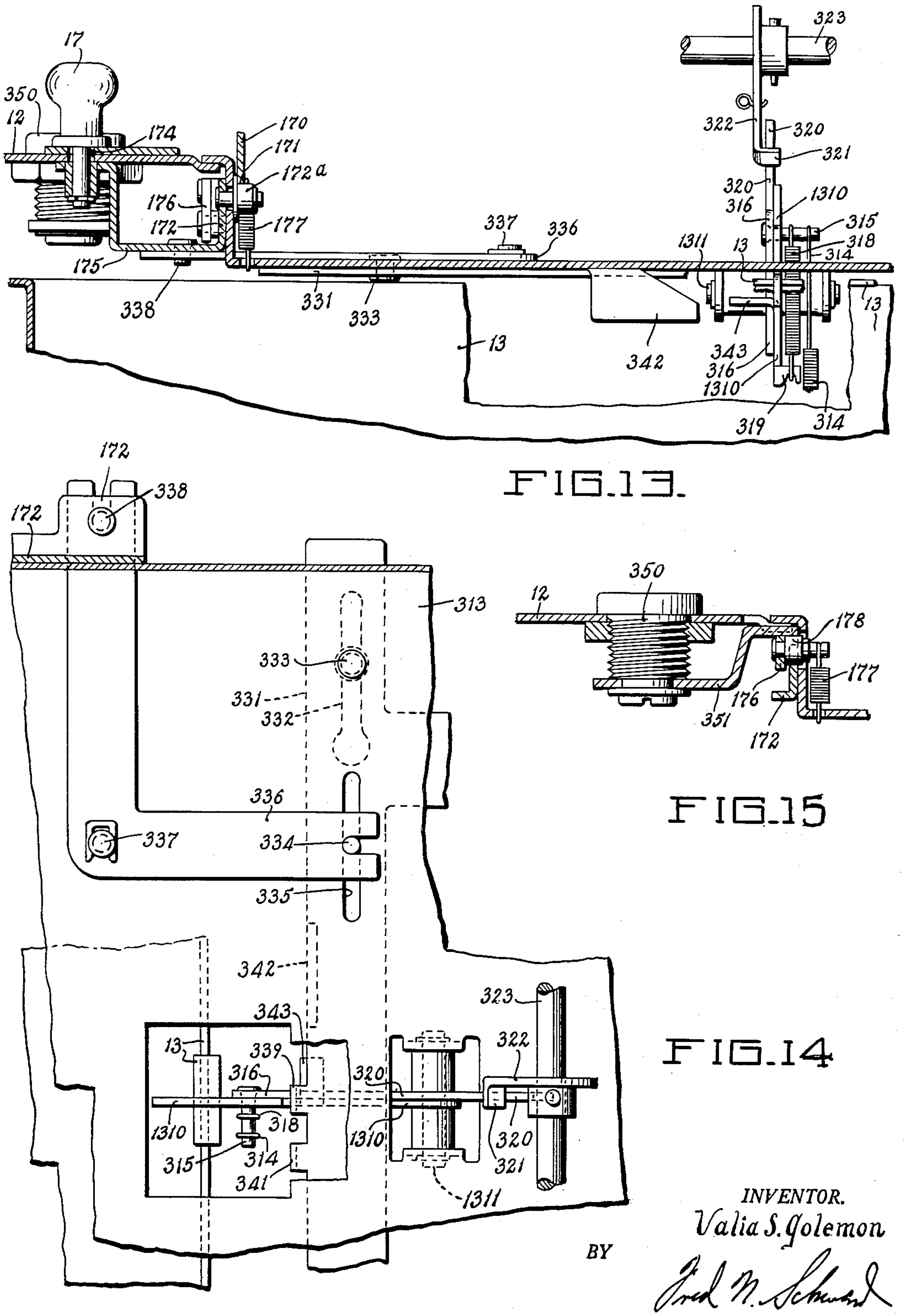
Fig. 13 is a transverse sectional view of the lower part of the machine illustrating the settable machine control knob and the cash drawer control mechanism.
Fig. 14 is a plan view, with parts broken away, illustrating the cash drawer control mechanism.
Fig. 15 is a sectional view illustrating the key lock control for the machine control knob and slide, and shows the lock in locking condition.

The machine comprises in general a computing section enclosed by a cover 11 (Figs. 1 and 2) and a cash drawer section enclosed by a cover 12 underlying the computing section and housing a retractable cash drawer partially illustrated at 13 (Figs. 3 and 13).

Amounts are entered into the machine through a keyboard comprising amount keys 14. A row of alphabet keys 15 at the left of the amount keys is provided for designation purposes only and therefore serve to control printing of corresponding characters only. A row of five accumulator selection keys 16 is located to the left of the designation keys 15 and serve jointly with a machine control knob 17 to preselect any of five accumulators for operation.

A cash bar 18, when depressed, causes the machine to additively enter amounts set up on the keys 14 into one or more of the accumulators depending upon the setting of the control knob 17 and the selection keys 16. A subtract or "paid-out" bar 19 when depressed causes the machine to subtract items entered into the keys 14 from a preselected accumulator, also depending upon the setting of the knob 17 and the keys 16.

A tax bar 20 is provided to enter tax values set upon the keys 14. Total and sub-total bars 21 and 22, respectively; are provided to total or sub-total items from one or another of the five accumulators depending upon the setting of the control knob 17 and certain of the selection keys 16.

*Racks and rack drive*

As disclosed in the aforementioned Boyden Patent 2,583,810, the machine is motor driven and includes a cyclically operable drive shaft 23 (Figs. 2, 4, 6 and 7) driven by a cyclic clutch (not shown) under control of the various depressible control bars 18 to 22, inclusive. Depression of any such bar causes a cycle of operation of the machine and a complete rotation of the shaft 23.

The shaft 23 is effective as will be described hereinafter to mesh one or more of five accumulators generally indicated at A, B, C, D and E (Fig. 3) with a series or pair of differentially operable racks 25 and 26. The shaft 23 is also effective to differentially advance these racks until arrested by depressed ones of the amount keys 14, and to release the cash drawer 13 from its retracted position under different conditions controlled by setting of the control knob 17 and in response to depression of the total bar 21.

The upper racks 25 are guided for fore and aft movement by a movable shaft 126 (Figs. 2 and 3) and a stationary shaft 27 extending through slots 28 and 29, respectively, formed in the racks. The lower racks 26 are similarly guided by stationary shafts 30 and 31 embraced by slots 32 and 33, respectively, in each lower rack. The racks 25 and 26, in each order of the machine, are coupled together to move fore and aft as a unit by means of a plate 34 secured by rivets 35 to the lower rack and provided with a pin and slot connection 36 with the upper rack.

The upper racks 25 are provided with a series of shoulders as at 37, the shoulders being spaced apart distances slightly greater than the spacing between the stems of the amount keys 14 whereby, when a rack is advanced until arrested by a depressed one of the associated amount keys, it will move a number of increments equal to the value of the depressed key.

Normally, when no key in an order is depressed, its associated racks 25 and 26 will be blocked from advancement by a zero block 38 carried by a key controlled latch 1210 to be described in detail later on. Such zero block is normally positioned directly in front of one of of the shoulders 37. However, upon depression of an associated key 14, the stem thereof will slide vertically along aligned slots in two spaced key plates 186 and 187 and a camming projection or lug 1212 (Fig. 12) thereon will become effective to move the zero block 38 out of cooperative engagement with the rack, permitting the same to be advanced until arrested by the stem of the depressed key.

For the purpose of differentially driving the various pairs of racks 25 and 26, the shaft 126 is driven laterally, i. e., fore and aft of the machine, by the drive shaft 23 through drive means (not shown) and is yieldably connected to each rack 25 by pairs of opposed drive elements 39 and 40. Each drive element is pivotally supported on the shaft 126 and each is provided with a roller 41 normally engaging a lateral depression formed at the closed end of the slot 28 in the respective rack. A spring 202 extends between the tails of the elements 39 and 40 to urge the latter apart and normally hold the rollers 41 in driving engagement with the notches in the slot 28 until the respective rack is arrested by an associated depressed key 14 or zero block 38.

A special symbol rack 25a (Fig. 2) is provided which is similar to the racks 25 but differentially controlled by the accumulator selector keys 16 so as to control a symbol printing device (not shown) to print a symbol identifying the particular accumulator into or from which an amount is entered or totalled.

*Accumulators*

The various accumulators A, B, C, D and E are of similar construction and each accumulator comprises independently rotatable, ordinally arranged, accumulator gears 43 rotatably mounted on an accumualtor shaft 44a, 44b, 44c, 44d and 44e, and arranged to mesh with either an upper rack gear section 45 or a lower rack gear section 46 on the respective racks, thereby to enter amounts in the accumulator either additively or subtractively.

As disclosed in the aforementioned Drake Patent 2,472,696, each accumulator includes a second shaft 47a, 47b, 47c, 47d and 47e (Figs. 2, 3, 4 and 7) which together with its shaft 44a, etc., supports the accumulator as a unit for vertical positioning. Each such shaft is guided at the opposite end thereof by vertical slots as at 205 formed in machine side frames 205a and embracing rollers 206 at the ends of the accumulator shafts.

Figures 4, 5:
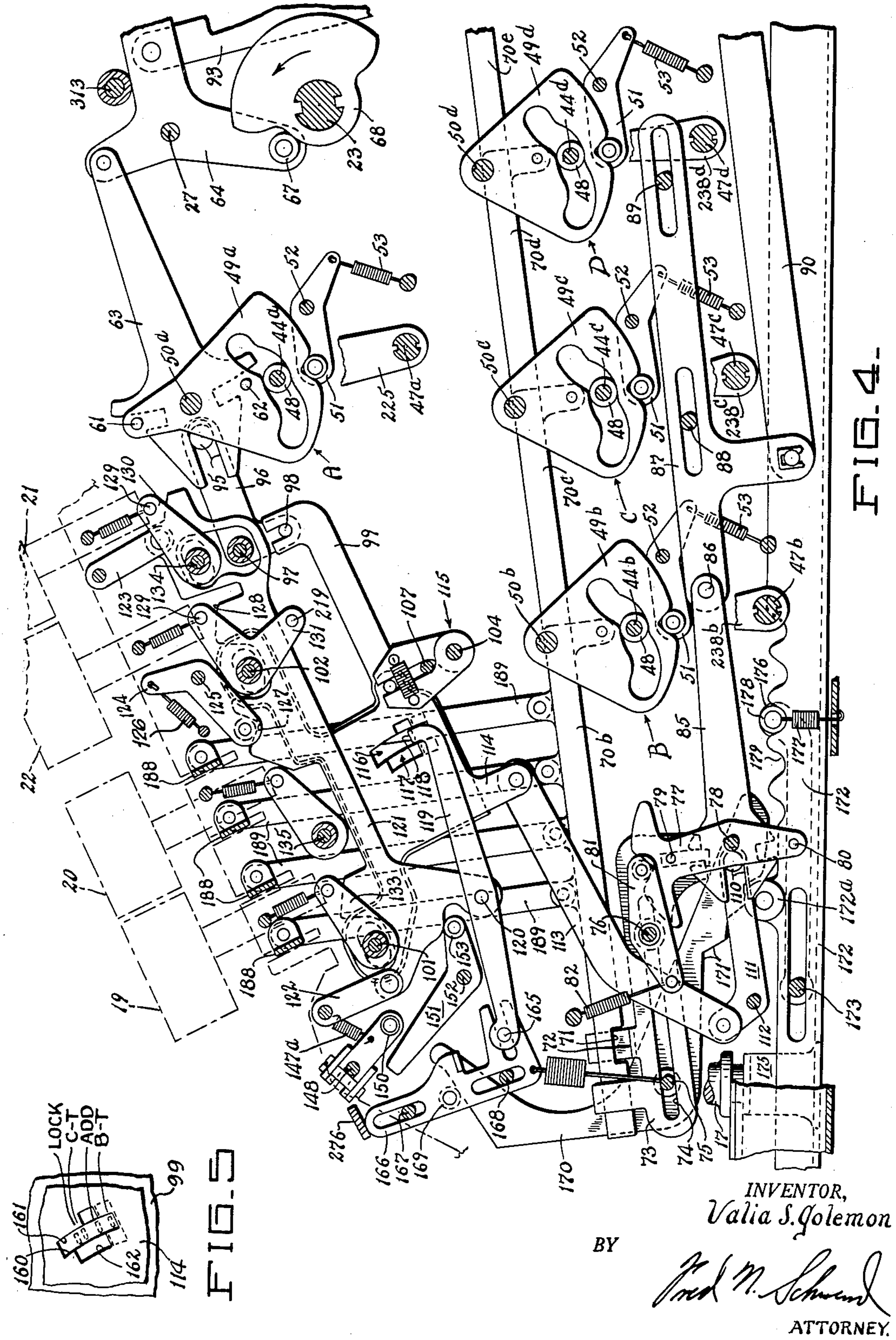
Fig. 4 is a sectional elevational view taken along the left hand side of the machine and particularly illustrating the controls for the accumulators.
Fig. 5 is a fragmentary view illustrating the control plate slots and different relative positions of the actuating element associated therewith.
Figure 6:
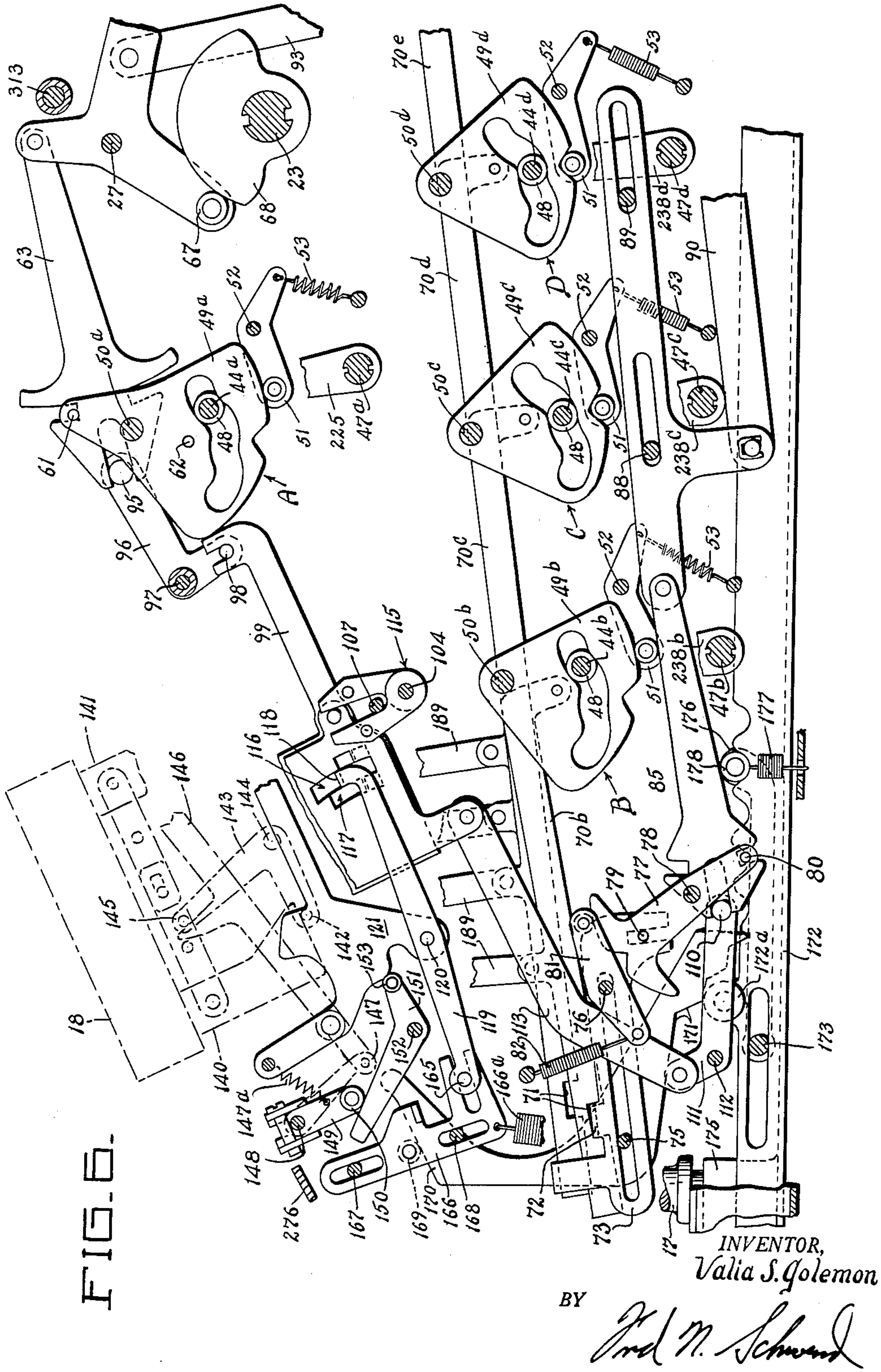
Fig. 6 is a view similar to Fig. 4 but illustrating the machine control knob set in a "C–T" position and the machine illustrated as having been operated through part of a cycle under control of the "cash" bar.

Referring to Figs. 4 and 6, each accumulator shaft 44a, etc., has rollers on opposite ends thereof, one of which is shown at 48, and each is embraced by a cam groove formed in a box cam, such as shown at 49a, 49b, 49c, 49d. Each cam is pivoted on a stationary frame stud as at 50a, 50b, 50c and 50d. Suitable means (not shown) are provided to transfer movement from the cams 49a, etc., at one end of each accumulator to the like cam at the opposite end whereby to effect parallel vertical movement of the accumulator upon rocking of the cams in a clockwise or counterclockwise direction from their neutral illustrated positions.

Each accumulator is normally held in its neutral position wherein the gears 43 thereof are out of mesh with both rack gear sections 45 and 46 of the associated racks, and for this purpose a centralizer 51 is provided, the latter being pivoted on a frame stud 52 and urged by a spring 53 into engagement with the undersurface of the box cam. The centralizer engages a centering notch in the cam when the accumulator is positioned in neutral position to normally yieldably hold the same in this position.

Counter-clockwise rocking of a box cam 49 from its central position will lower the associated accumulator into mesh with the lower rack gear sections 46 of the associated racks to effect substractive entry into the accumulator or totaling of amounts from the accumulator, while clockwise rocking of the cam from its neutral position will raise the accumulator into its additive position in mesh with the rack gear sections 45.

Means are provided for totaling or sub-totaling amounts from selected ones of the accumulators and for this purpose each accumulator gear 43 is provided with a zero stop ear 55 (Fig. 3). A plurality of zero stop levers 56, one for each order of the machine, are keyed on the associated accumulator shafts 47a, etc., in alignment with the ears 55.

Normally the shafts 47a, etc., are held in position to locate the zero stop levers 56 out of the path of the ears 55 on the various accumulator gears. However, during totaling and sub-totaling operations, the shafts 47a, etc., are rocked, as will be described in detail hereinafter, to position the levers 56 into the paths of the various ears 55 so as to arrest the associated gears when the latter are rotated in subtractive directions to their zero positions by the various associated racks.

*Upper and lower accumulator engaging devices*

Means are provided to set the upper accumulator A in either an upper "add" position in engagement with the upper rack gear sections of its associated racks 25 (Fig. 3) or in a lower "subtract" position in engagement with the lower rack gear sections of its associated racks, under the joint control of the various control bars and control knob 17 as will be described hereinafter.

The box cam 49a associated with the accumulator A carries a pair of pins 61 and 62 on opposite sides of its pivot support stud 50*a*. These pins are adapted to be engaged by a hook member 63 pivotally connected to a three-arm cam follower 64. The latter is pivoted on the aforementioned stationary shaft 27 and is urged counter-clockwise by a spring 66 (Fig. 7) to maintain a roller 67 thereon gainst a cam 68 keyed on the aforementioned cyclic drive shaft 23. The latter cam 68 has a high portion extending substantially half way around its periphery whereby to rock the cam follower 64 clockwise and thereby move the hook member 63 rearward and hold it in such rearward position during approximately the first half of the machine cycle. If during such rearward movement, the hook member 63 is maintained in its neutral position illustrated in Fig. 4, it will be ineffective to rock the box cam 49*a* and the accumulator will therefore be maintained in its neutral position so that no amount will be entered therein by the racks even though the latter are advanced. However, if the hook member 63 is held in a raised or lowered position wherein it embraces the upper pin 61 or the lower pin 62 during actuation by the cam 68 it will be effective to rock the box cam 49*a* clockwise or counter-clockwise, respectively, and thus raise or lower the accumulator A.

Means also operated by the cam 68 are provided to raise or lower a selected one or ones of the lower accumulators B, C, D and E into either an upper "add" position or a lower "subtract" position under control of the various control bars and settable control knob 17.

Figure 8:
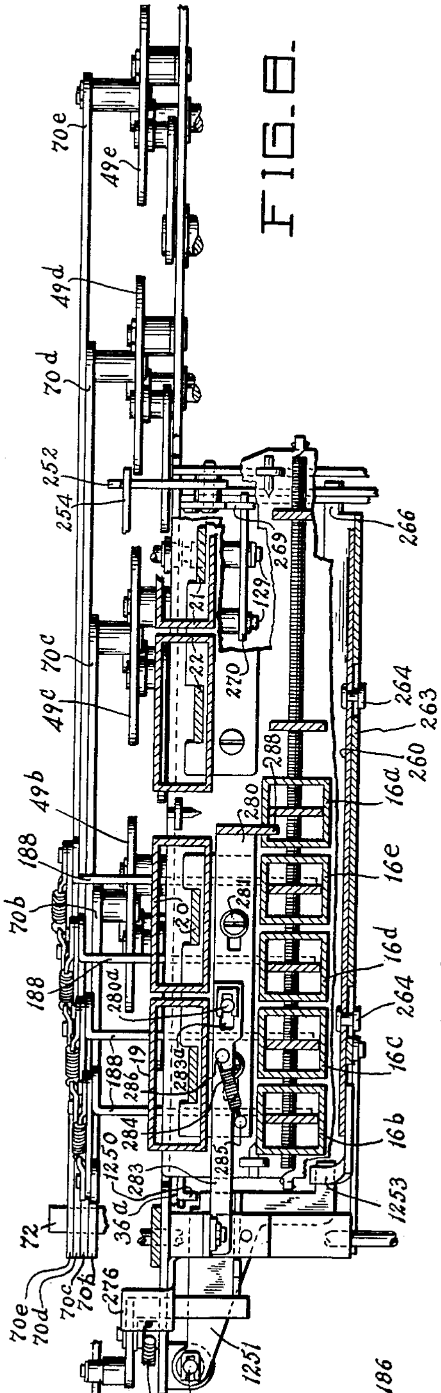
Fig. 8 is a sectional plan view of the keyboard and is taken substantially along the line 8—8 of Fig. 2.

As mentioned hereinbefore, the various lower accumulators B, C, D and E are set in their upper and lower positions by box cams 49*b*, 49*c*, 49*d* and 49*e*, respectively (Figs. 4, 6 and 8). A plurality of coupling links 70*b*, 70*c*, 70*d* and 70*e* are pivotally connected at their rear ends to respective ones of the cams 49*b*, etc., and are arranged in side by side relation as shown in Fig. 8. These various links have notches 71, formed in the forward ends thereof which normally overlie an ear 72 formed on an actuator slide 73. The latter is provided with an elongated slot 74 guided over stationary frame pins 75 and 76. As will be described hereinafter, the various control links 70*b*, etc., are normally held in their raised positions illustrated in Fig. 4 but may be lowered by depressing selected respective ones of the accumulator selection keys 16*b*, 16*c*, 16*d* and 16*e*, into coupling engagement with the actuator slide 73.

The slide 73 has a pin and slot connection with a rockable lever 77 pivoted on a frame pin 78 and provided with pins 79 and 80 located on opposite sides of the pin 78.

A centralizer 81 pivoted on the frame pin 76 is urged by a spring 82 into engagement with the upper periphery of the lever 77 and normally engages a centralizing notch therein whereby to hold the lever 77 in its neutral position illustrated in Fig. 4.

A hook member 85 cooperates with the pins 79 and 80 on lever 77 and is effective to engage either or neither of these pins during actuation thereof. When the hook member 85 is held in an upper or lower position it will be effective to rock the lever 77 clockwise or counter-clockwise, respectively, from its neutral position to thereby actuate the slide 73 and thus rock a selected one of the accumulator positioning box cams 49*b*, etc. Fig. 6 illustrates the hook member 85 and affiliated parts in actuated position.

The hook member 85 is pivotally connected at 86 to a slide 87 having slots therein guided over frame pins 88 and 89. The slide 87 is actuated by the aforementioned cam 68 through a link 90 (see also Fig. 7) which is pivotally connected at its rear end to a three-armed lever 91 pivoted on a frame pin 92 and connected by a link 93 to the cam follower 64 of cam 68.

From the foregoing, it will be seen that during each cycle of operation of the machine, the cam 68 will be effective, through the linkage noted, to actuate both hook members 63 and 85 to raise or lower selected ones of the accumulators from their neutral positions.

*Accumulator selection control mechanism*

The five accumulators A, B, C, D and E are normally selected for engagement with their associated racks by the five accumulator selection keys 16. However, this selection is superseded at certain times by the setting of the machine control knob 17 as will appear hereinafter.

Figures 16, 17, 18:
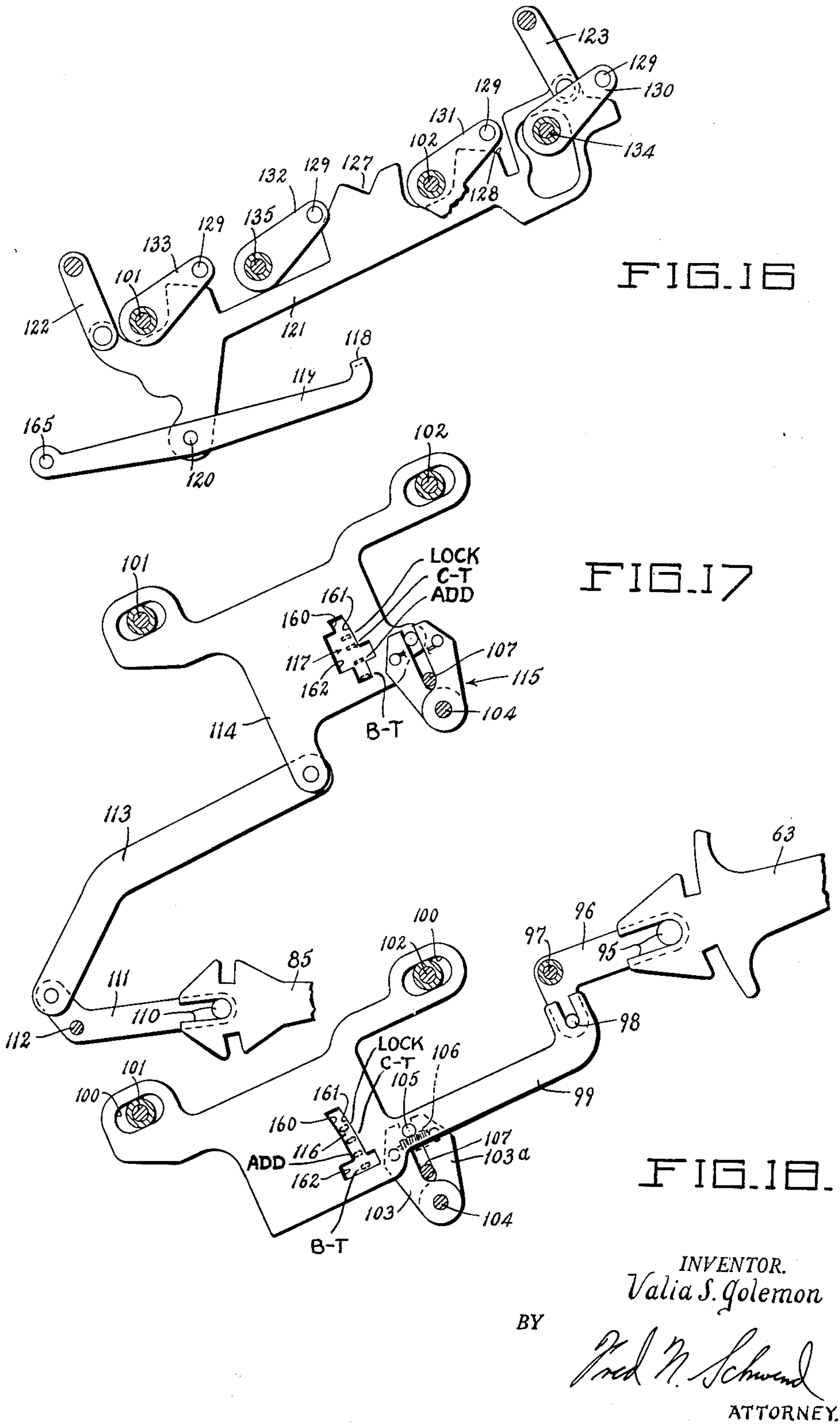
Fig. 16 is a side view of the control bar actuated cam bar and actuating lever.
Fig. 17 is a side view of one of the accumulator control plates.
Fig. 18 is a side view of the other of the accumulator control plates.

The upper hook member 63 is connected through a pin and slot connection 95 (Figs. 4 and 6) to a bell-crank 96 pivoted at 97 and connected through a second pin and slot connection 98 to an extension of a control plate 99 (see also Fig. 18). This plate is provided with slots 100 and embracing stationary frame pins 101 and 102 for guiding the plate fore and aft.

The plate 99, and consequently the associated hook member 63, is normally yieldably maintained in a neutral or central position by a centralizer comprising opposed arms 103 and 103*a* independently pivoted on a frame stud 104 and urged against the opposite sides of a pin 105 on the plate by a spring 106 tensioned between the two arms. The arms 103 and 103*a* also are normally held by the spring 106 in embracement with a second frame stud 107 to thus normally maintain the plate 99 in its neutral position illustrated in Figs. 4 and 18.

The lower hook member 85 is coupled through a pin and slot connection 110 to a lever 111 pivoted at 112 and connected through a link 113 to a second control plate 114 (Figs. 4 and 17) which lies in juxtaposition with the aforementioned plate 99 and is provided with guide slots also embracing the frame pins 101 and 102 for fore and aft guiding movement either independently or conjointly with plate 99. The plate 114 and its associated hook member 85 are normally held in their neutral positions illustrated in Figs. 4 and 17, independently of the plate 99, by a centralizer generally indicated at 115 similar to that above described for the plate 99.

Control plates 99 and 114 are provided with irregular shaped slots 116 and 117, respectively (Figs. 4, 5, 6, 17 and 18) into both of which extends the ear 118 of an actuator lever 119. The lever 119 is pivotally connected at 120 to a cam bar 121 (see also Fig. 16) suspended for fore and aft movement by swinging links 122 and 123. The cam bar 121 thus forms a carrier for the actuator lever 119.

The cam bar 121 is normally yieldably held in its neutral position illustrated in Fig. 4 by a centralizer 124 pivotally supported at 125 and urged by a tension spring 126 into a V-shaped centralizing notch 127 formed on the upper edge of the cam bar 121. The latter is also provided with camming surfaces, one of which is indicated at 128, on the upper edge thereof, which surfaces underlie and are arranged to be cammed by pins 129 carried by levers 130, 131, 132 and 133. The levers 131 and 133 are pivotally supported on the aforementioned frame pins 102 and 101, respectively, while the levers 130 and 132 are pivoted at 134 and 135, respectively. The pins 129 underlie the stems of the different control bars.

The upper camming surfaces of the bar 121 are so formed that depression of the subtract bar 19, the total bar 21 and sub-total bar 22 will cam the latter forwardly, i. e., to the left in Fig. 4, to cause the actuating lever 119 to move one or the other of the plates 99 and 114, depending upon the position of the ear 118 of lever 119, along the slots 116 and 117 so as to actuate one or the other of the hook members 63 and 85 into their subtract engagement controlling positions.

The camming surface on bar 121 underlying the pin 129 associated with the tax bar 20 is inclined in an opposite direction to the remaining camming surfaces 128 so that depression of the tax bar will cam the bar 121 rearwardly causing the actuator lever 119 to move one or the other or both of the control plates 99 and 114 (depending on the positioning of lever 119) and thus position one or the other or both of the hook members 63 and 85 in their add control positions.

Means are provided whereby the cash bar 18, upon depression, is effective to move the cam bar 121 rearward to position one or the other or both of the hook members 63 and 85 in their add control positions in the same manner as is effected by the tax bar 20. The add bar 18 (Fig. 6) is provided with two stems 140 and 141 suitably guided for depression. The stem 140 overlies a pin 142 on a bell-crank 143 pivoted at 144 and provided with a second pin 145 overlying a projection on a link 146. The latter is pivotally connected to an arm 147 suitably fixed to a shaft 148 carrying a second arm 149 which has a roller 150 thereon overlying a lever 151 pivoted at 152 and provided with a roller 153 engaging a camming surface formed on the cam bar 121. Thus depression of the cash bar 18 will cause the bell-crank 143 to force the link 146 forwardly and thereby rock the arm 149 against the action of a spring 147*a* tensioned between the same and a suitable part of the frame (not shown). Rocking of shaft 148 by the arm 147 will cause arm 149 to actuate lever 151 and thus force the cam bar 121 rearward.

As mentioned heretofore, the slots 116 and 117 in the plates 99 and 114, respectively, are irregular. These slots comprise arcuate working surfaces 160 and 161 (Figs. 4, 5, 17 and 18) on the opposite edges of the slots, such working surfaces extending substantially concentric with the pivot 120 of the lever 119 when the parts are in their centralized position.

When the ear 118 of lever 119 is aligned with a working surface 160, it will be effective, upon actuation of the cam bar 121 by the bars 19, 21 or 22, to actuate the associated plate or plates in a forward direction. Likewise, when the ear 118 of the lever 119 is aligned with a working surface 161, it will be effective upon rearward movement of the cam bar 121 by the bars 18 or 20 to actuate one or both plates rearward. However, when the ear 118 is in alignment with a cut-out portion or non-working surface 162 of one or another of the slots 116 and 117 it will be ineffective to actuate the associated control plate during actuation of the cam bar 121 and will thus be ineffective to move the respective hook 63 or 85 out of its neutral position.

Means are provided for selectively setting the control lever 119 into different angular positions so as to locate the ear 118 in the different positions indicated by the dotted lines in Fig. 5, in or out of line with different working and non-working portions of the slots 116 and 117 in the control plates 99 and 114. For this purpose, the actuating lever 119 is operatively connected to the machine control knob 17 through the following linkage.

The forward end of the lever 119 is connected through a pin and slot connection 165 with a slide 166 having vertical slots therein embracing pins 167 and 168, the slide being urged downwardly by a spring 166*a* tensioned between the same and a part of the frame (not shown). A roller 169 rotatable mounted on slide 166 engages a camming surface formed on a bell-crank 170 pivoted on the frame pin 75 and provided with a stepped camming surface 171 on its under edge. The latter surface overlies a roller 172*a* carried by a slide 172. The latter is guided for fore and aft movement by frame pins, one of which is shown at 173 embraced by guide slots in the slide.

Figure 1:
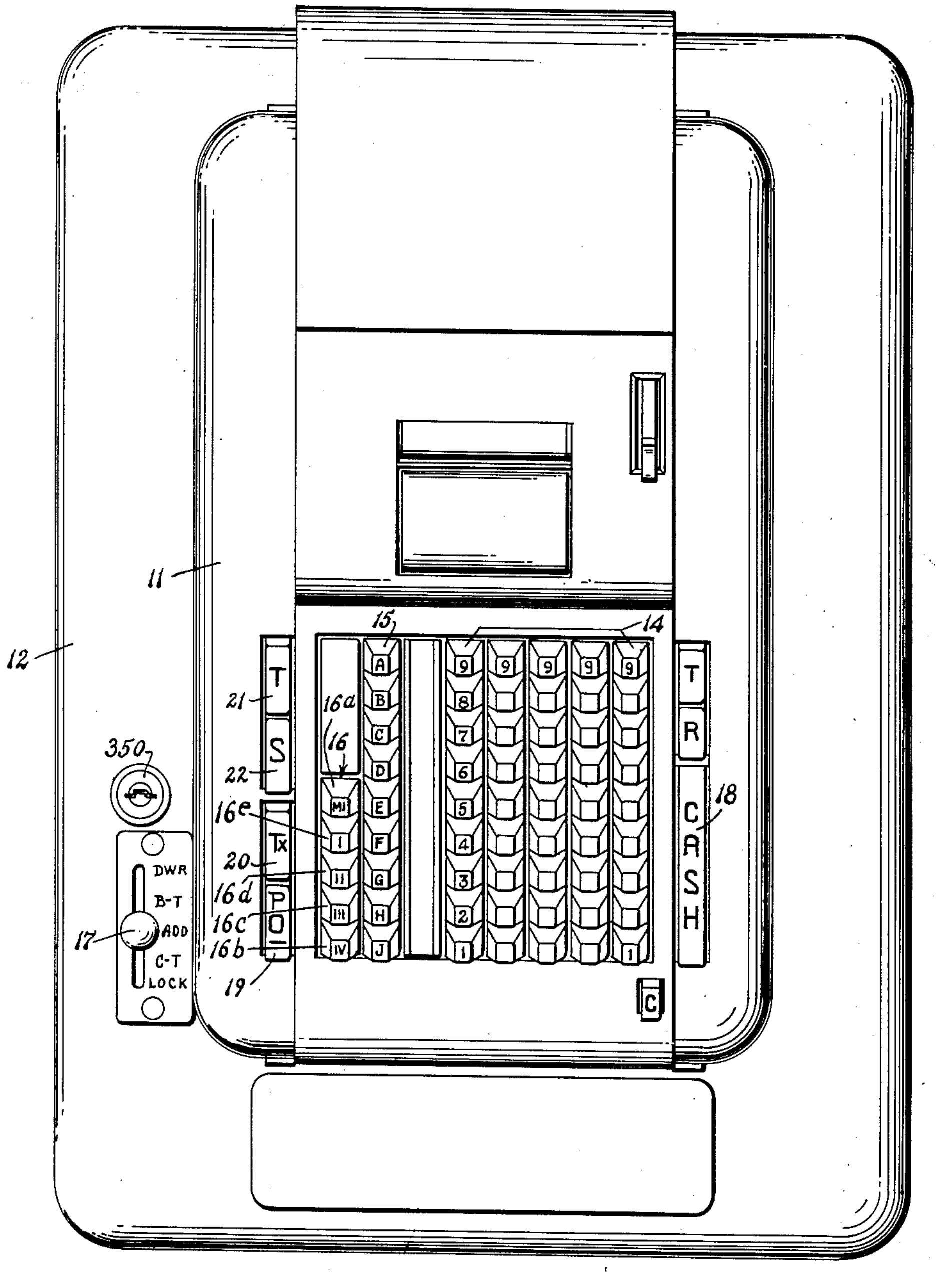
Fig. 1 is a plan view of a cash registering machine embodying the present invention.

The control knob 17 (Figs. 1, 4, 6 and 13) is attached to a U-shaped extension 175 on the slide 172 and protrudes through a slot 174 in the drawer casing 12, permitting manual setting of the slide 172 into any of four positions (symbolically indicated in Fig. 1 as B–T, Add, C–T and Lock) and movement thereof into a fifth position indicated in Fig. 1 as DWR. Fig. 4 indicates the knob 17 and parts attached thereto as set in "Add" position.

From the foregoing, it will be seen that as the slide 172 is moved lengthwise by manipulation of the control knob 17, the roller 172*a* on the latter slide will move along the stepped camming surface 171 of the lever 170, rocking the latter into different angular positions which, through the slide 166, will rock the actuating lever 119 into corresponding different angular positions so as to cooperate with different working surfaces of the slots 116 and 117 in the plates 99 and 114.

The slide 172, and consequently the actuating lever 119 and control knob 17, is centralized in any of four positions by a centralizer lever 176 fulcrumed on the frame pin 173 and urged downward by a spring 177 to yieldably maintain a roller 178 on the lever in centralizing engagement with one of four detenting notches 179 formed in the slide 172.

Means are provided to enable each of the four accumulator selection keys marked 16*b*, 16*c*, 16*d* and 16*e* (Figs. 1, 2, 4 and 8) to engage their associated coupling links 70*b*, 70*c*, 70*d*, etc., with the actuating slide 73 preparatory to operating the machine under control of a selected control bar. Each of such keys has the stem thereof slidably mounted in aligned slots in the two spaced key plates 186 and 187, as shown in particular in Figs. 2 and 11. An extension 188 projecting laterally from each such key stem, as shown in Figs. 4 and 8, is connected by a link 189 to a respective one of the coupling links 70*b*, 70*c*, 70*d* and 70*e*, whereby depression of a selection key acts to couple a respective one of the coupling links with the actuator slide 73. For example, Fig. 6 illustrates the link 70*b* associated with the first lower accumulator B as coupled to the actuator slide 73 in response to depression of the selection key 16*b*.

The remaining key 16*a* is effective upon depression to permit operation of the machine, printing of a special symbol and automatic selection of the upper accumulator. It should be noted at this point that the selection of the various accumulators and type of operation which they are enabled to perform is controlled by the control knob 17. For example, when the knob is moved to its C–T position, the upper accumulator A is automatically enabled to add, subtract, total and sub-total under control of the appropriate machine bars, i. e., 18, 19, 20, 21, and 22 (providing one of the keys 16*a* to 16*e* is depressed) while the lower accumulators B, C, D, and E are selected by respective depressed ones of the keys 16*b*, 16*c*, 16*d*, and 16*e*. These latter accumulators are, however, enabled to add only in this position of the knob.

When the control knob 17 is moved to its Add position, the upper accumulator A is enabled to add, subtract, total and sub-total but the lower accumulators B, C, D, and E are disabled in all operations even though a selection key, such as 16*b*, for a lower accumulator may be depressed.

When the control bar 17 is moved to its B–T position, the upper accumulator is disabled in all operations but the lower accumulators B, C, D, and E are enabled to be selected by their respective selection keys and are enabled to add, subtract, total and sub-total under control of the appropriate machine bars.

*Totaling and sub-totaling controls*

In totaling operations, a selected accumulator is returned to zero by the associated racks during the first part of the operating cycle and is then placed in neutral position during the return of the racks in the same manner as in addition and subtraction operations. However, in sub-totaling operations, the selected accumulator is returned to zero by the racks during the first part of a cycle and is then again reset at its former accumulated value by the racks during the latter part of the cycle. Thus, it is necessary in sub-totaling operations to maintain the accumulator in mesh with its drive racks until the latter have returned from their forward movements. For this purpose, a cam 211 (Figs. 2 and 7) is mounted on the drive shaft 23 in juxtaposition to the cam 68 and is provided with a high portion extending around the major portion of the periphery thereof. This cam engages a roller 212 on a second cam follower 213 pivoted on the shaft 27 and urged counter-clockwise into contact with the cam 211 by a tension spring 214.

A slot 215 is formed in the rear of the extending arm of cam follower 213 which is coextensive with a second shorter slot 216 in the cam follower 64. A pin 217 carried by a link 218 rides within one or both of the slots 215 and 216 depending on the position of the link longitudinally of the machine.

The link 218 is connected through a pin and slot connection 219 to the lower end of the aforementioned lever 131 associated with the sub-total bar 22.

Figure 7:
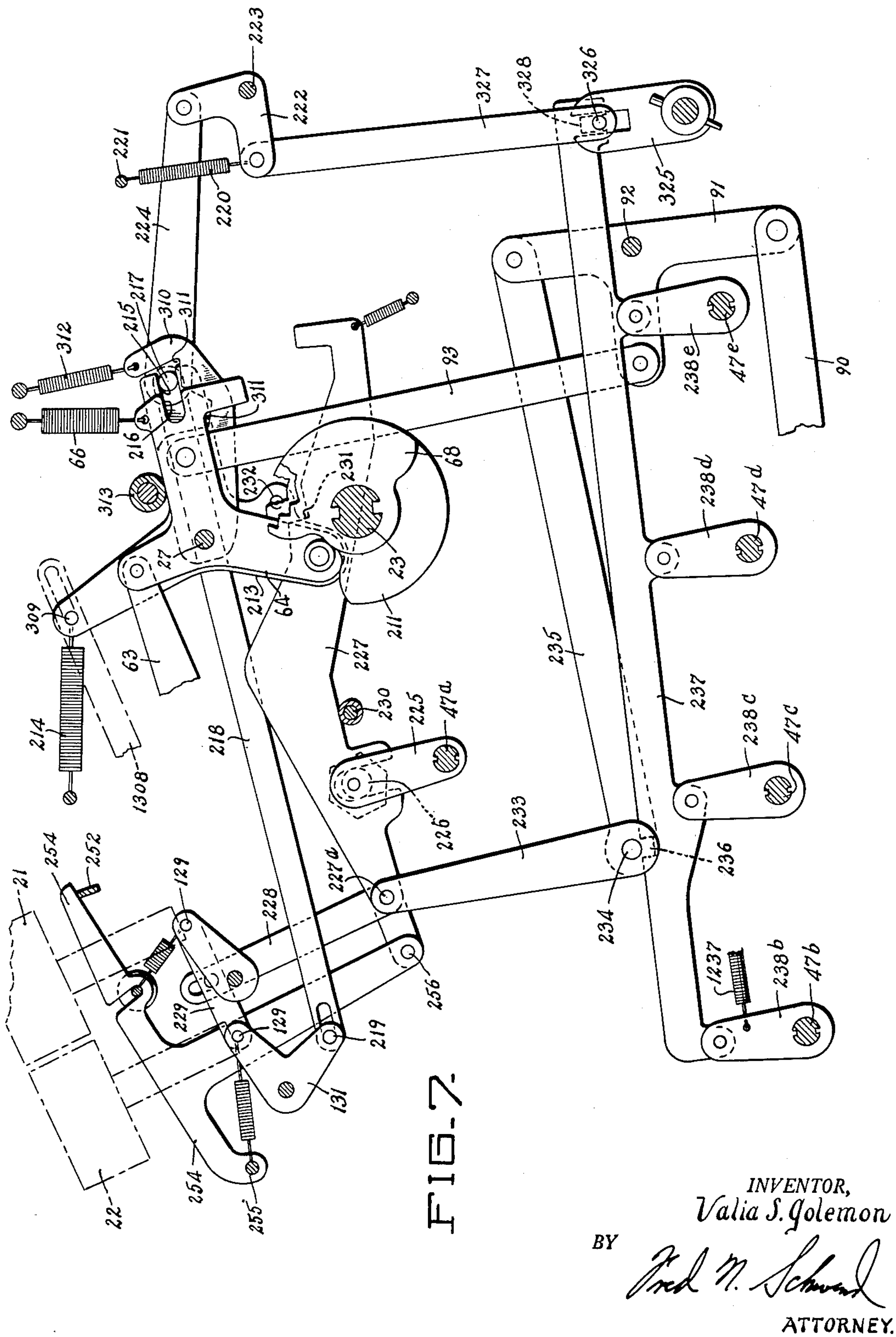
Fig. 7 is a sectional elevational view taken along the left hand side of the machine, illustrating part of the controls for the machine and particularly the controls for effecting totaling and sub-totaling.

Normally, the pin 217 is held in its rearmost position illustrated in Fig. 7, wherein it is located solely within the slot 215 in cam follower 213 by a tension spring 220. The latter is tensioned between a frame stud 221 and one arm of a bell-crank 222 pivoted at 223 and connected to the pin 217 by a link 224.

Upon depression of the sub-total bar 22, the link 218 will be actuated to position the pin 217 forwardly within both slots 215 and 216. Thus, during a sub-totaling operation, the two cam followers 64 and 213 will move as a unit and the cam 211 will therefore become effective to cause the hook 63 and/or 85 to maintain a selected accumulator engaged with its associated drive racks throughout the major portion of the cycle.

In order to detent the pin 217 in either of its two settings without adding to the key pressure normally required to move the same over a spring pressed detent, a normally ineffective detent 310 is pivoted on the shaft 27 in line with the pin 217 and has two detenting notches adapted to engage the pin 217 in one or the other of its settings. The centralizer is urged upward by a spring 312. However, when the machine is at rest, as shown in Fig. 7, the centralizer limits against a stationary stop 313, out of engagement with the pin 217. Upon actuation of the cams 68 and 211 and consequent rocking of the cam followers 64 and 213, the pin 217 will be lowered while in either setting thereof, depending on whether or not the sub-total bar 22 is depressed. Thus, the pin will engage one or the other of the centralizer notches 311, wherein it will be retained until subsequent return of the cam followers.

Means are also provided under control of the total and sub-total bars for rocking the various zero stop levers 56 (Fig. 3) into blocking relation with the ears 55 on the various accumulator gears 43.

The accumulator shaft 47*a* carrying the zero stop lever 56 associated with the upper accumulator A has secured thereto an arm 225 coupled through a pin and slot connection 226 to a floating lever 227. The forward end of the latter lever 227 is connected at 227*a* to the lower end of a link 228, the upper end of which is pivotally connected to a cross link 229 intermediate its ends. The link 229 is pivotally connected at its ends to the pins 129 underlying the stems of the bars 21 and 22.

Upon depression of either of the bars 21 or 22, the link 229 will be lowered sufficiently to cause link 228 to rock the lever 227 counter-clockwise about a stationary fulcrum pin 230 to position a shoulder 231 thereon in the path of a pin 232 carried by the cam follower 213. Thus, as the cam follower 213 is actuated at the beginning of a total or sub-total operation, the pin 232 will drive the lever 227 forwardly, rocking the shaft 47*a* to position the zero stop levers 56 in blocking relation with the accumulator gear ears 55.

The aforementioned link 228 is also connected through the pivotal connection 227*a* to the upper end of a link 233 which is connected through a pin 234 to the forward end of an actuating link 235. The latter link is pivotally connected at the rear end thereof to an upstanding arm on the lever 91 which, it will be recalled, is rocked by the bell-crank 64 through the link 93 during each cycle of the machine. The pin 234 is normally located directly above a notch 236 in a link 237, the latter being pivotally connected to arms 238*b*, 238*c*, 238*d* and 238*e* secured to the accumulator shafts 47*b*, 47*c*, 47*d* and 47*e*, respectively, associated with the lower accumulators B, C, D and E. Thus, depression of either the total bar 21 or sub-total bar 22 will lower the pin 234 into the slot 236, coupling the links 235 and 237 together. Thus, the link 237 will be actuated forwardly against the action of a spring 1237 so that the various accumulator shafts 47*b*, etc., will be rocked counter-clockwise to position the associated zero stop levers 56 into zero blocking relation with the associated accumulator gears.

*Key locking and releasing mechanism*

Means are provided to maintain the depressed amount keys 14 and the accumulator selection control keys 16*a*, etc., in their lowered positions and to release the same automatically upon operation of the machine under certain conditions, depending upon the setting of the control knob 17 and the particular control bar depressed.

Figure 10:
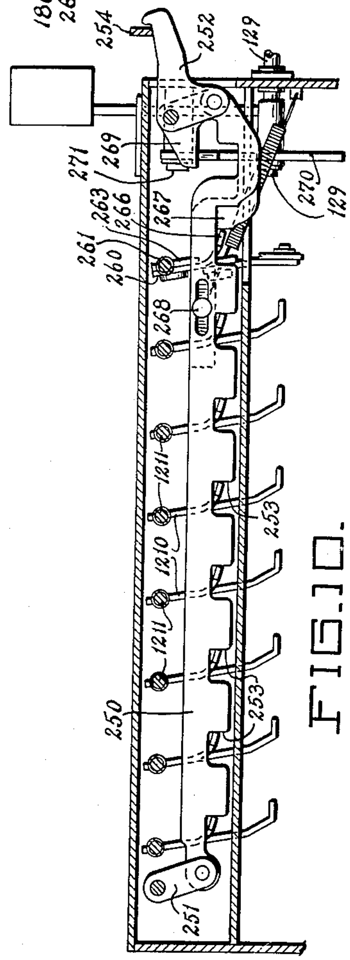
Fig. 10 is a transverse sectional view illustrating the amount key release mechanism and is taken along the line 10–10 of Fig. 2.
Figure 12:
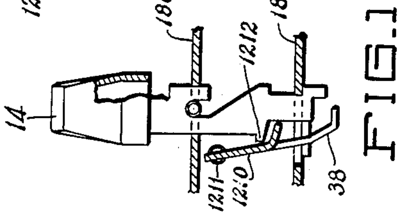
Fig. 12 is a transverse sectional view illustrating one of the amount keys.

Associated with each row of amount keys 14 and designation keys 15 is a key latch 1210 (Figs. 10 and 12). The latter extends along the associated row of keys and is supported for pivotal movement by trunnion bearings 1211 located at opposite ends. Each latch 1210 has a ledge along the bottom thereof which underlies a lateral projection 1212 on the stem of the associated amount key 14 and designation key 15. Upon depression of a key, its projection 1212 rocks the associated latch 1210 laterally against the action of a tension spring (not shown) thus releasing a previously depressed key in the same row. When the key being depressed reaches the bottom of its stroke, the latch 1210 moves to a position overlying the projection 1212 thereby holding the key depressed.

Means are provided to automatically release all of the key latches 1210 associated with the amount keys 14 and designation keys 15 at the beginning of a total or sub-total operation of the machine. For this purpose, a key release bar 250 (Figs. 8 and 10) is pivotally supported at one end by a link 251 and at the opposite end by a bell-crank 252 for longitudinal movement. A series of shoulders 253 are formed on the release bar, each of which lies directly in front of a projection formed on each of the key latches 1210. A laterally extending arm of the bell-crank 252 underlies a lever 254 (see also Fig. 7) pivoted at 255. One arm of the lever 254 is pivotally connected at 256 to a forward extension of the aforementioned floating lever 227. Thus, as the lever 227 is advanced forwardly at the start of a total or sub-total operation it will rock the lever 254 clockwise, thereby actuating the bell-crank 252 to move the key release bar 250 to the left as viewed in Fig. 10 to rock the various key latches 1210 to release any depressed amount or designation keys. Means (not shown) are also provided to actuate the key release bar 250 at the end of all cycles except repeat cycles so as to release depressed amount and designation keys which have been depressed as an incident to add or subtract operations of the machine.

Means are provided to selectively release depressed ones of the accumulator selection keys 16. As will appear hereinafter, movement of the control knob 17 into its B–T position from any other position will directly release the keys 16*a*, but none of the other keys 16*b* to 16*e*. Also, when the control knob is in either of its "add" or C–T positions, depression of the total bar 21 will effect release of any depressed one of the keys 16*a* to 16*e*.

Figure 11:
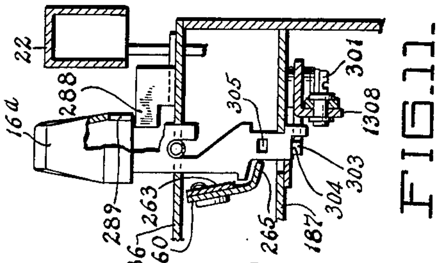
Fig. 11 is a transverse sectional view taken substantially along the line 11–11 of Fig. 2.

Referring to Figs. 2, 8, 10 and 11, the selection keys have associated therewith a special key latch 260 supported for pivotal movement by trunnion bearings 261 at opposite ends thereof and urged toward engagement with the selection key stems by spring means (not shown). The latch 260 has a ledge 262 underlying only the four selection keys 16*b*, 16*c*, 16*d* and 16*e*. This latch has no connection with the release bar 250. However, a secondary latch 263 is mounted on the latch 260 for longitudinal sliding movement relative thereto by elongated slots embracing and guided by studs 264 on the latch 260. The latch 263 has a short ledge 265 normally located in the path of the projection 1212 of the stem of the selection key 16*a* as seen in Figs. 2 and 11.

A projection 266 extends rearwardly from the secondary latch 263 and is normally located directly in front of a shoulder formed on an auxiliary key release bar 267. The latter is supported at one end for movement laterally of the machine by a stud 268 carried thereby and embraced by an elongated guide slot in the key release bar 250. The other end of the release bar 267 is supported by a bell-crank 269, one arm of which overlies one arm of a cam lever 270 pivoted at 271. The lever 270 has a pair of camming surfaces 272 and 272*a* (Fig. 2) underlying the pins 129 associated with the total and sub-total bars 21 and 22, respectively. Thus, depression of either of these bars will rock the cam lever 270 counter-clockwise to actuate the bell-crank 269 and key release bar 267. The bar 267 will normally swing the latches 260 and 263 outwardly as a unit to release any or all depressed selection keys.

However, the latch 263 is arranged to be moved forwardly at any time upon movement of the control knob 17 to its B–T position whereby to release the selection key 16*a* from depressed position and to remove the projection 266 from cooperative relation to the release bar 267 so that the total or sub-total bar will then be ineffective to release any depressed ones of the selection keys 16*b*, 16*c*, 16*d*, and 16*e* from depressed positions. For this purpose, the latch 263 is rather loosely connected through a link 273 to a lever 274 pivoted at 275. The lever 274 is provided with an ear 276 (see also Figs. 4 and 8) overlying the aforementioned slide 166, which it will be recalled, is positioned under control of the machine control knob 17.

Normally, when the control knob 17 is located in its "add" or "C–T" setting, the slide 166 will be respectively positioned at or below its setting illustrated in Figs. 2 and 4 wherein a spring 277 tensioned between the ear 276 and a suitable part of the machine frame (not shown) will be effective to hold the lever 274, link 273 and latch 263 in their relative positions illustrated in Fig. 2. Thus, depression of either of the bars 21 and 22 will be effective to actuate the latches 263 and 260 to release any or all depressed ones of the selection keys 16*a* to 16*e*, thereby compelling the operator to again depress a correct one of the selection keys 16 before a new transaction can be entered into the machine. However, when the control knob 17 is moved rearward into its "B–T" position, the slide 166 will be raised to rock the bell-crank 274 clockwise and thus draw the latch 263 forwardly, removing the ledge 265 from latching relation to the selection key 16*a* and removing the projection 266 from cooperative relation to the auxiliary slide 267. Thus, the key 16*a* may be free to rise if previously depressed.

Means are also provided for preventing depression of the selection key 16*a* upon movement of the control knob 17 into its "B–T" position. A blocking slide 280 (Figs. 2, 8 and 11) is slidably mounted on the upper key plate 186 by guide screws 281 and 282 extending through elongated slots in the slide 280. A link 283 is connected between the slide 280 and an upper arm of the lever 274 by a lost motion connection comprising an elongated slot 283*a* in the link 283 which embraces a pin 280*a* on the slide 280. A spring 284 is connected between pins 285 and 286 on the slide 280 and link 283, respectively, whereby to normally maintain the blocking slide 280 rearward relative to the link 283. With the lever 274 in its position illustrated in Fig. 2, a projection 288 on the blocking slide 280 extends in alignment with a notch 289 in the selection key 16*a*, permitting depression of this key. However, as the lever 274 is rocked clockwise in response to movement of the control knob 17 into its "B–T" position, the blocking projection 288 will be shifted rearwardly to block depression of the selection key 16*a*. If the selection key 16*a* were latched in depressed position upon rearward movement of the control knob 17 into its "B–T" position, the spring 284 would yield as the slide 280 engages the depressed key 16*a* and would thereafter snap the slide 280 into blocking position under the key as soon as the latter was released by the latch 263.

Figure 9:
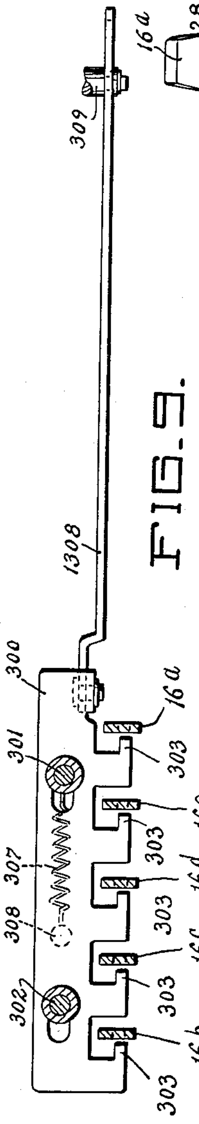
Fig. 9 is a sectional plan view taken substantially along the line 9—9 of Fig. 2, illustrating the accumulator selection key locking device.

Means are provided to prevent depression or release of an accumulator selection key during cycling of the machine. For this purpose, a key locking slide 300 (Figs. 2, 9 and 11) is slidably mounted on the undersurface of the lower keyboard plate 187 by studs 301 and 302 which extend through elongated slots in the slide. A series of locking projections 303 on slide 300 are located directly adjacent the stems of the various accumulator selection keys. These projections are adapted to extend into blocking engagement with the undersurface 304 of an undepressed selection key or into blocking engagement with an aperture 305 of a depressed key.

The slide 300 is urged rearward by a light tension spring 307 extending between a stud 308 on the slide and the frame stud 301. A link 1308 is pivotally connected at its forward end to the slide 300 and is coupled at its rear end through a pin and slot connection 309 to an extension of the aforementioned cam follower 213. However, the spring 307 is ineffective to overcome the spring 214 and the slide 300 is therefore under control of the latter spring. Thus, immediately upon commencement of a cycle of operation the cam 211 becomes effective, through cam follower 213 and link 1308, to draw the slide 300 rearwardly to block the selection keys 16*a*, etc., in their raised or depressed positions and to lock the same in such conditions until the end of the cycle whereupon the slide will be returned, along with the cam follower 213, to its normal position illustrated in Fig. 2.

Means are provided to enforce depression of an accumulator selection key 16*a*, etc., before the machine can be operated to effect additive or subtractive entries while the machine control knob is in its "C–T" or "add" position.

As noted in the aforementioned patents, a clutch control bar, a fragment of which is indicated at 36*a* (Figs. 2 and 8), is connected in a manner not shown to the cyclic clutch of the machine whereby forward movement of the control bar in a forward direction will effect engagement of the clutch and operation of the machine. An ear 1250 of the clutch control bar 36*a* is normally blocked by an arm 1251 pivotally supported by a vertical pivot pin 1252 and urged counter-clockwise as viewed in Fig. 8 into a position blocking forward movement of the clutch control bar. A finger 1253 is suitably secured to the aforementioned key latch 260 and projects into engagement with an extension on the arm 1251. When a selection key 16*a*, etc., is depressed, the latch 260 will be rocked about its trunnion bearings, causing the projection 1253 to rock the arm 1251 clockwise against the action of its spring out of blocking relation to the clutch control bar so that the latter may be actuated upon depression of a selected control bar.

However, during a totalling or sub-totalling operation the special key latch 260 (Figs. 2 and 10) is rocked by the total or sub-total bars and the cam lever 270, as described hereinbefore, causing the finger 1253 to rock the blocking arm 1251 out of blocking relation with the clutch control bar, thus permitting engagement of the clutch even though all of the keys 16*a* to 16*d* are released.

*Cash drawer control*

The cash drawer as disclosed in detail in the aforementioned Boyden et al. Patent No. 2,607,526, and as partially indicated at 13 in Figs. 3, 13 and 15, is suitably mounted in the cash drawer casing 12 for movement to and from an open accessible position. Spring means (not shown) are provided to yieldably urge the drawer toward its open position. However, the drawer is normally held in its illustrated closed position by a latch 1310 pivotally supported at 1311 on a bracket 1312 depending from a frame 1313 forming the base for the computing section of the machine, which frame is integral with the cash drawer casing 12.

The drawer latch 1310 is normally held in its illustrated position, in latching engagement with the rear wall of the drawer 13, by a spring 314 extending between a portion of the machine frame (not shown) and a pin 315 carried on an arm 316, also pivoted at 1311 independently of the latch 1310. The pin 315 normally rests against a shoulder 317 on the latch to yieldably hold the same in its latching position.

A spring 318 is tensioned between the pin 315 and an ear 319 on the latch 1310 to normally hold the arm 316 in its illustrated position relative to the latch 1310, and an extension 320 on the arm underlies the ear 321 of an arm 322 which is fastened on a rock shaft 323.

Means are provided for rocking the shaft 323 counterclockwise to thereby cause the latch 1310 to release the cash drawer 13 during totaling operations only, and for this purpose the shaft 323 has secured thereon a second arm 325 (Fig. 7) having a slot therein embracing a pin 326 carried at the lower end of a link 327, the upper end of which is pivotally connected to the aforementioned bell-crank 222. The pin 326 is also embraced by a slot 328 formed in the aforementioned zero stop arm actuating link 237 which, it will be recalled, is actuated by the mechanism illustrated in Fig. 7 during both totaling and subtotaling operations. Thus, during totaling operations, wherein the linkage including elements 224, 222 and 327 are allowed to remain in their positions illustrated in Fig. 7 under control of the spring 220, the pin 326 couples the arm 325 to the link 237 so that as the latter is moved forwardly (to the left of Fig. 7) it will transmit a counter-clockwise rocking motion to the shaft 323, causing the arm 322 to actuate the lever 316 and latch 1310 to release the cash drawer. However, upon depression of the sub-total bar 22, the bell-crank 131 actuated thereby will draw the links 218 and 224 forwardly, thereby cause the bell-crank 222 to lower link 327 and shift the pin 326 out of engagement with the notch 328 in link 327.

In some instances, it is desirable to maintain the drawer 13 in closed condition throughout a machine operation, such as when the machine is operated as an adding machine, in which case the control knob 17 is set in its "add" position illustrated in Fig. 1. For this purpose, means under control of the knob 17 are provided to block actuation of the latch 1310 by the lever 317 even though the latter may be operated as an incident to a totaling operation. A cross slide 331 (Figs. 13 and 15) is provided having elongated slots, one of which is illustrated at 332, embracing guide studs, i. e., 333, fixed to the bottom of the frame 313. The slide 331 has a pin 334 therein extending upwardly through a slot 335 in the frame 313 and coupled through a pin and slot connection to a bell-crank 336. The latter is pivoted at 337 on the frame 313 and is coupled through a pin and slot connection 338 to the rear end of the aforementioned slide 172 (see also Figs. 4, 6 and 13) to which the knob 17 is attached.

Figs. 13 and 14 illustrate the parts in positions located by setting the control knob 17 in its "add" position, and in such position a blocking lug 339 on the slide 331 is positioned directly over the latch 1310. Thus, operation of the machine under control of the total or sub-total key will cause the spring 318 to yield during movement of the lever 316 by the arm 322 and the drawer will be retained in its closed position. A second blocking lug 341 is located on the slide 331 in such a position that when the control knob 17 is moved to its "lock" position, the latter lug will be located over the latch 1310 to likewise prevent movement thereof to drawer release position.

However, upon movement of the knob 17 to its "C–T" or "B–T" positions, both blocking lugs 339 and 341 will be moved out of registry with the latch 1310, permitting operation of the same in response to depression of the total bar.

On the other hand, movement of the knob 17 into its "drawer" position will cause a camming lug 342 on the slide 331 to engage a lug 343 integral with the latch 1310 and thus directly raise the latter to drawer releasing position without operating the machine.

*Machine lock*

A key lock generally indicated at 350 (Figs. 1 and 15) is provided to selectively lock the control knob 17 and slide 172 in any of the positions to which it may be set. The lock 350 is mounted on the casing 12 and has a lock arm 351 extending therefrom. The lock arm 351 normally extends toward the rear of the machine out of engagement with the centralizer roller 178 for the slide 172. However, upon turning of the lock by a suitable key into locking condition, the arm is swung into the position illustrated in Fig. 15 where it overlies the centralizer roller 178, preventing the same from being raised upon attempted movement of the knob 17 into a different one of its positions.

*Operation*

Although the machine by virtue of its aforementioned construction is capable of being operated in different manners depending on the particular system adopted by the proprietor, the following is a preferred method of procedure in registering normal transactions.

In carrying out the usual cash transactions, the control knob 17 is set into its C–T (customer total) position and one or more selected lower accumulator selecting key or keys **16*b*, 16*c*, 16*d* or 16*e* is depressed, the latter depending on the particular accumulator or accumulators into which the value of the particular article being rung up is to be entered. Upon depression of the cash bar 18**, both the selected lower accumulator and the upper accumulator are meshed with the racks to receive the amount set up on the amount keys. Such amounts are also printed, along with identifying symbols indicating the particular lower accumulator into which they were entered.

Miscellaneous amounts are entered into the upper accumulator only as an incident to depression of the MI key **16*a* and the cash bar 18**. Thus, the customer's total is accumulated in the upper accumulator A as well as in the various lower accumulators, except for miscellaneous amounts which are accumulated in the upper accumulator only.

At the completion of a transaction, the total bar 21 is depressed, the latter releasing any or all depressed accumulator selection keys 16 to effect totalling out of the upper accumulator A only, thus obtaining a total of the customer's transaction.

Thereafter, the machine may be used to register further transactions, or it may be set to effect normal add or subtract operations without disturbing the various totals registered by the lower accumulators. For the latter purpose, the control knob 17 is set into its "add" setting and the "cash" (add) bar 18 or PO (subtract) bar 19 operated in the usual manner, and regardless of the setting of the accumulator selection keys 16. Totalling or subtotalling upon depression of bars 21 and 22, respectively, will be effective from the upper accumulator A only, since the actuator lever 119 (Fig. 4) will be set in a position to actuate only the upper accumulator control plate 99.

At the end of a particular period, i. e., the end of a day, at which time it is desired to obtain separate grand totals of amounts registered in different lower accumulators, the control knob 17 is set into its B–T (bottom or lower total) position to selectively effect totalling out of the lower accumulators. The various accumulator selection keys, except key 16*a*, are then depressed, one at a time, and totals taken therefrom in the usual manner by depressing the total bar 21. Subtotals obviously could, instead, be taken by depressing the subtotal bar 22. Since no running grand total is kept of the entries of miscellaneous amounts which are otherwise registered in the upper accumulator, the MI key 16*a* is locked against depression to warn the operator of this condition. Also, blocking of the key 16*a* in this condition of the knob 17 prevents a totalling operation from being effected with no accumulator meshing with the racks, since if such were possible the racks would be free to move to their fullest extents, resulting in the erroneous printing of 9's.

From the foregoing it will be seen that customer transaction operations or grand total taking operations may be interrupted at any time, and the machine used to perform add or subtract calculations without disturbing the values registered in the lower accumulators. Also, during such interrupted periods, a particular depressed lower accumulator selection key 16*b*, etc., may be allowed to remain in depressed condition without affecting the intervening operation.

Although I have described my invention in detail in its preferred form, and therefore have utilized certain specific terms and languages herein, it is to be understood that the present disclosure is illustrative rather than restrictive and that changes and modifications may be made thereto without departing from the spirit or scope of the claims appended hereto.

Having thus described my invention, what I desire to secure by United States Letters Patent, is:

1. In a calculating machine, the combination of an operating mechanism, an accumulator, differential actuators therefor, mechanism normally effective upon operation of said operating mechanism for operatively connecting said accumulator to said actuators whereby to enable said actuators to actuate said accumulator, control means for said operating mechanism including a depressible key; spring means for maintaining said key in raised position, a device for latching said key depressed, a device for blocking said key against depression, and manually controlled means selectively settable in one position to disable said second mentioned mechanism, disable said latching device and enable said blocking device, said selectively settable means being settable in a second position to enable said second mentioned mechanism, enable said latching device and disable said blocking device.

2. In a calculating machine, the combination of a normally disabled operating mechanism, a plurality of accumulators, an additional accumulator, differential actuators for said accumulators, mechanism effective upon operation of said operating mechanism for operatively connecting selected ones of said accumulators to said actuators, control means for said operating mechanism including individual depressible keys for enabling operation of said operating mechanism and for controlling said second mentioned mechanism to connect respective ones of said first mentioned accumulators to said actuators; means for normally causing said connecting mechanism to invariably connect said additional accumulator to said actuators, an additional depressible key associated with said additional accumulator, means controlled by said additional key upon depression thereof for enabling said operating mechanism, spring means for maintaining said keys in raised position, a device for latching said keys depressed, means for concurrently causing operation of said operating mechanism and for actuating said device to release all depressed ones of said keys, and means selectively settable to actuate said device to release said additional key only and to disable said second mentioned means.

3. In a calculating machine as claimed in claim 2, means controlled by said last mentioned means for blocking said additional key against depression.

4. In a calculating machine, the combination of a normally disabled operating mechanism, a plurality of accumulators, an additional accumulator, differential actuators for said accumulators, mechanism effective upon operation of said operating mechanism for operatively connecting selected ones of said accumulators to said actuators, control means for said operating mechanism including individually depressible keys for enabling operation of said operating mechanism and for controlling said second mentioned mechanism to connect respective ones of said first mentioned accumulators to said actuators; means for normally causing said connecting mechanism to invariably connect said additional accumulator to said actuators, an additional depressible key associated with said additional accumulator, means controlled by said additional key upon depression thereof for enabling said operating mechanism, spring means for maintaining said keys in raised position, a main key latch for latching all but said additional one of said keys depressed, an auxiliary key latch carried by said main key latch for latching said additional key depressed, means for causing operation of said operating mechanism, said last mentioned means comprising a key release device normally operatively connected to said auxiliary key latch for actuating both said latches to release depressed ones of said keys, and means for shifting said auxiliary key latch relative to said main key latch whereby to render said operative connection ineffective, to release said additional key, and to disable said second mentioned means.

5. In a calculating machine as claimed in claim 4, a normally ineffective device for blocking depression of said additional key, and means responsive to actuation of said last mentioned means for enabling said blocking device.

6. In a calculating machine, the combination of an accumulator, differential actuators for said accumulator, a normally disabled operating mechanism, control means including a settable key for enabling said operating mechanism; mechanism normally effective upon operation of said operating mechanism for operatively connecting said accumulator to said actuators whereby to enable said actuators to actuate said accumulator, spring means for maintaining said key in unset position, a latching device for latching said key in set position, a second control means normally in cooperative relation with said latching device for concurrently causing operation of said operating mechanism and for actuating said latching device to release said key from set position, and manually operable means for removing said latching device from cooperative relation with said second control means, for causing said latching device to release said key from set position, for blocking said key against resetting to set position, and for disabling said accumulator connecting mechanism.

References Cited in the file of this patent

UNITED STATES PATENTS

| | | |
|---|---|---|
| 1,637,827 | Kottmann | Aug. 2, 1927 |
| 2,055,522 | Dicke | Sept. 29, 1936 |
| 2,356,714 | Webb | Aug. 22, 1944 |
| 2,485,695 | Carlstrom | Oct. 25, 1949 |
| 2,528,647 | Garbell | Nov. 7, 1950 |
| 2,583,810 | Boyden | Jan. 25, 1952 |